(12) United States Patent
Sana et al.

(10) Patent No.: US 8,602,401 B2
(45) Date of Patent: Dec. 10, 2013

(54) JIG USED FOR MANUFACTURING COMPOSITE MATERIAL STRUCTURE

(75) Inventors: Toshikazu Sana, Kakamigahara (JP); Yasuo Hanafusa, Yatomi (JP); Tomoya Takahashi, Ibi-gun (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 5 days.

(21) Appl. No.: 13/505,366

(22) PCT Filed: Nov. 1, 2010

(86) PCT No.: PCT/JP2010/006439
§ 371 (c)(1),
(2), (4) Date: Jun. 1, 2012

(87) PCT Pub. No.: WO2011/055524
PCT Pub. Date: May 12, 2011

(65) Prior Publication Data
US 2012/0235336 A1    Sep. 20, 2012

(30) Foreign Application Priority Data
Nov. 6, 2009   (JP) .................................. 2009-255520

(51) Int. Cl.
*B25B 1/00*     (2006.01)
(52) U.S. Cl.
USPC ............................... 269/47; 269/48.1; 269/52
(58) Field of Classification Search
USPC ............................................ 269/47, 48.1, 52
See application file for complete search history.

(56) References Cited

U.S. PATENT DOCUMENTS

| 4,632,328 | A | 12/1986 | Bishop et al. |
| 5,170,967 | A | 12/1992 | Hamamoto et al. |
| 5,223,067 | A | 6/1993 | Hamamoto et al. |
| 5,939,007 | A | 8/1999 | Iszczyszyn et al. |

FOREIGN PATENT DOCUMENTS

| JP | A-3-248997 | 11/1991 |
| JP | A-5-116162 | 5/1993 |
| JP | A-8-770 | 1/1996 |
| JP | A-8-281833 | 10/1996 |
| JP | A-2004-352187 | 12/2004 |
| JP | A-2007-130801 | 5/2007 |
| JP | A-2009-178988 | 8/2009 |
| WO | WO 2008/015115 A1 | 2/2008 |

OTHER PUBLICATIONS

Translation of Feb. 1, 2011 International Search Report issued in International Patent Application No. PCT/JP2010/006439.

*Primary Examiner* — Lee D Wilson
*Assistant Examiner* — Shantese McDonald
(74) *Attorney, Agent, or Firm* — Oliff & Berridge, PLC

(57) ABSTRACT

A bladder-type jig which is suitably used for manufacturing a stiffened panel structure using a hat stringer, and improves durability of the jig to enable repeated use of the jig. A body which is a body of a bladder has a hollow pipe-shape inside thereof. One end portion of the body is sealed by a terminal metal member, and the interior of body is in an air-tight condition. An insertion portion of the terminal metal member is inserted into a hollow space of the end portion of the body. A plurality of band-shaped groove portions are provided on the outer peripheral surface of the insertion portion such that the groove portions are wound around the outer peripheral surface. The band-shaped groove portions form a plurality of annular adhesive layers between the inner surface of the body and the outer peripheral surface of the insertion portion. This makes it possible to enhance an adhesive state between the body and the terminal metal member and air tightness in the interior of the body.

4 Claims, 8 Drawing Sheets

JIG USED FOR MANUFACTURING COMPOSITE MATERIAL STRUCTURE

TECHNICAL FIELD

The present invention relates to a jig for use in manufacturing a composite material structure using a fiber-reinforced resin composite material. Particularly, the present invention relates to an inflatable bag-shaped jig (bladder) for use as a jig of a hat (hat-shaped) stringer in manufacturing a structure using the hat stringer as a frame member.

BACKGROUND ART

In recent years, fiber-reinforced resin composite materials (hereinafter suitably referred to as "composite materials") have been widely used in fields in which metal materials have been used so far. Among the composite materials, carbon-fiber-reinforced materials which are formed such that carbon fibers used as reinforced fibers, are impregnated with matrix resin such as epoxy resin, have a smaller weight and a higher strength than metal materials. Because of this, the carbon-fiber-reinforced materials are widely used in fields of sport activity articles, industrial machines, and aerospace.

Among these fields, in the field of aerospace, for example, in structures such as wings or bodies of aircraft, a stiffened panel in which a skin comprising a composite material is integrated with a stiffener which is a lightweight metal frame member, has been used. As a typical stiffener, there are a stringer and a frame. The stringer is a member having a relatively small thickness and is placed to extend in a lengthwise direction of the structure. The frame is a member having a relatively great thickness and is placed to cross the stringer in a direction (direction perpendicular to the lengthwise direction) of the transverse cross-section of the structure. The stringers are supported by jigs and arranged to conform to the shape of the structure. Plural sheets of prepreg are stacked together with the stringers, and the resulting stack is pressurized and heated in an autoclave. As a result, the prepreg is cured into skin, and the stringers are adhesively attached to and integrated with the skin. Further, the frame is attached to the stringers, thereby forming a stiffened panel.

There are various kinds of stringers depending mainly on a difference in cross-sectional shape. To be specific, there are known a flat plate shape, a columnar shape, a C-shape, an I-shape, an L-shape, a Z-shape, and a hat shape. Among these, the hat stringer has recently attracted an attention, because it is suitable for weight saving of a structure, for the reason described below.

The aircraft is required to minimize its weight, but is required to have a sufficient strength. Because of this, a thickness of the skin which is a body of the stiffened panel cannot be set constant, but is set greater in a region required to have a higher strength and smaller in a region which can provide a sufficient strength, thereby achieving a reduced weight. The jig supporting the stringer is an elongated member extending along the stringer, and defines a positional relationship between the prepreg and the stringer. The jig is drawn out along its lengthwise direction after the prepreg is cured. Because of this, if the skin has a uniform thickness, a surface of the skin which contacts the stringer is flat. Therefore, it is relatively easy to draw out the jig having supported the stringer after the prepreg is cured. However, if the skin has many non-uniform thickness regions, unevenness is generated in the surface of the skin which contacts the stringer. The jig is also curved to correspond to the unevenness. In this case, it is difficult to draw out the jig.

The hat stringer has a pair of flat band-shaped portions extending in a lengthwise direction of the stringer, and a channel portion having a transverse cross-section recessed in a trapezoidal shape between the band-shaped portions. If the structure is a body of the aircraft formed of a one piece barrel (OPB), the band-shaped portions are surfaces (adhesion surfaces) adhesively attached to the inner surface of the skin. The hat stringers are placed along the lengthwise direction of the body with the adhesion surfaces being at an outer side, and the frame is placed in a circumferential direction of the body, thereby forming an assembly having a predetermined structure, for example, a cylindrical structure. The prepreg is wound around outside of the cylindrical structure and stacked thereon. Furthermore, a jig such as a mandrel is attached to the interior of the cylindrical structure. In a space formed between the skin and each of the hat stringers, i.e., inner side of the channel portion, an elongated jig called a bladder is inserted.

The bladder is made of a material having flexibility and elasticity (stretchability). The bladder is inflatable (expandable) and contractible and has a structure of an elongated bag-shape. During a state where the bladder is inserted as the jig into the channel portion, an internal pressure is increased to allow the bladder to be inflated (expanded). Thus, the bladder maintains a state where the prepreg is stretched under tension to prevent the prepreg from being deformed between the band-shaped portions. At a time point when the prepreg has been cured into the skin, the internal pressure is lowered, and the bladder is contracted and drawn out of the channel portion. At this time, the band-shaped portions of the stringer are adhesively attached to and integrated with the inner surface of the skin. Therefore, it may be difficult to draw out a normal jig due to unevenness on the inner surface of the skin. However, at this time, the bladder has changed its state from the inflated state to the contacted state to have a smaller cross-section and has a flexibility, and therefore, the bladder can be easily drawn out of the channel portion without being affected by the unevenness.

The bladder has a function similar to that of an inflatable mandrel. An exemplary inflatable mandrel has a configuration in which the mandrel is composed of plural layers and has a cylindrical bag shape inflatable and contractible, as disclosed in Patent Literature 1. In this configuration, during molding, the mandrel is inflated and serves as an inner mold (core) with respect to an outer mold. In the contracted state, the mandrel is easily inserted into a cavity of the outer mold, and is easily drawn out of a molded drum-shaped object. As a specific manufacturing technique using the inflatable mandrel, for example, Patent Literature 2 discloses a manufacturing technique of a racket using the inflatable mandrel, and Patent Literature 3 discloses a technique for manufacturing a spar of a rotary wing aircraft using the inflatable mandrel.

CITATION LISTS

Patent Literature

Patent Literature 1: U.S. Pat. No. 4,632,328
Patent Literature 2: Japanese Laid-Open Patent Application Publication No. Hei. 8-000770
Patent Literature 3: U.S. Pat. No. 5,939,007

SUMMARY OF THE INVENTION

Technical Problem

As described above, the general bladder has a configuration in which a terminal metal member which is a metal-made sealing member and has a pressurization hole for pressurizing the interior of a pipe-shaped body is attached to one end portion of the pipe-shaped body and a terminal plug which is a sealing member made of an elastic material is attached to the other end portion. In some cases, the bladder having the terminal metal member has a problem which is not assumed in the general inflatable mandrel.

To be specific, the bladder serves as a "backing member" of the prepreg. Since the terminal metal member has the pressurization hole, the terminal metal member is not covered with the prepreg but is exposed in the channel portion in a state where the bladder is inserted into the channel portion of the hat stringer. This is because of the fact that when the hat stringer and the bladder are introduced into the autoclave and heated and pressurized therein, a pressurized atmosphere is transmitted to the interior of the body through the pressurization hole. Therefore, when the bladder is drawn out of the channel portion after treatment in the autoclave, the terminal metal member is dragged to outside.

However, if the bladder is drawn out by dragging the terminal metal member to outside in repetition, a portion of the body and a portion of the terminal metal member which are adhesively attached together may be separated from each other, depending on the structure of the bladder. Even slight separation may lead to a phenomenon in which the pressurized atmosphere leaks from the interior of the body in the middle of the treatment in the autoclave, while significant separation may lead to a situation in which the bladder cannot be used. Such a problem will not exist in the techniques disclosed in Patent Literature 1 to Patent Literature 3 in which the bladder is used only as the inner mold during the molding, but is unique to the bladder serving as the "backing member."

The present invention is directed to solving the above mentioned problem, and an object of the present invention is to provide a bladder-type jig which is suitably used to manufacture a stiffened panel structure using a hat stringer, among composite material structures, and can implement durability which enables repeated use.

Solution to Problem

According to the present invention, there is provided a jig used for manufacturing a composite material structure, the jig being inserted into a channel portion of a hat stringer and used, when the composite material structure is manufactured by attaching prepreg to a frame structure including the hat stringer as a frame member, the channel portion extending in a lengthwise direction of the hat stringer; the jig comprising: a body having a pipe shape and made of an elastic material, the body having a transverse cross-section of a trapezoidal shape which is a cross-section perpendicular to a lengthwise direction of the body; and a terminal metal member attached to one end portion of the body and having a pressurization hole for pressurizing an interior of the body; wherein the terminal metal member has an insertion portion inserted into a hollow space of the body; the insertion portion has a columnar shape having a transverse cross-section conforming in shape to a contour shape of the hollow space of the body; the insertion portion is provided on an outer peripheral surface thereof with a band-shaped groove portion wound around the outer peripheral surface; and the insertion portion is inserted into the hollow space of the body in a state where an adhesive (adhesive agent) is filled in the band-shaped groove portion.

In accordance with this configuration, the band-shaped groove portion provided on the insertion portion forms a space in which an adhesive is filled, and allows the filled adhesive to be retained in an annular shape like a seal material (sealing component) around the insertion portion, in a state where the insertion portion is inserted into the body. This makes it possible to improve an adhesive state between the terminal metal member and the body and improve air tightness in the interior of the body. Because of this, when the jig used for manufacturing the composite material structure is drawn out of the region between the cured skin and the hat stringer, the adhesive state between the terminal metal member and the body is not reduced. As a result, a life of the jig used for manufacturing the composite material structure can be extended, and the inflated state of the jig used for manufacturing the composite material structure can be maintained stably.

In the jig used for manufacturing the composite material structure, preferably, the band-shaped groove portion includes a plurality of band-shaped groove portions provided on the insertion portion. The plurality of band-shaped groove portions can improve the adhesive state and the air tightness more effectively.

In the jig used for manufacturing the composite material structure, the elastic material which is a material of the body is not particularly limited, but a heat resistant rubber composition material is preferably used. As the heat resistant rubber composition material, there are a silicone rubber composition material, a fluorine rubber composition material, etc.

The above and further objects, features and advantages of the present invention will more fully be apparent from the following detailed description of preferred embodiments with accompanying drawings.

Advantageous Effects of the Invention

As described above, in accordance with the present invention, the jig used for manufacturing the composite material structure is suitably used for manufacturing a stiffened panel structure using the hat stringer. The present invention has an advantage that durability of the jig for enabling repeated use of the jig is implemented.

Figure 1A:
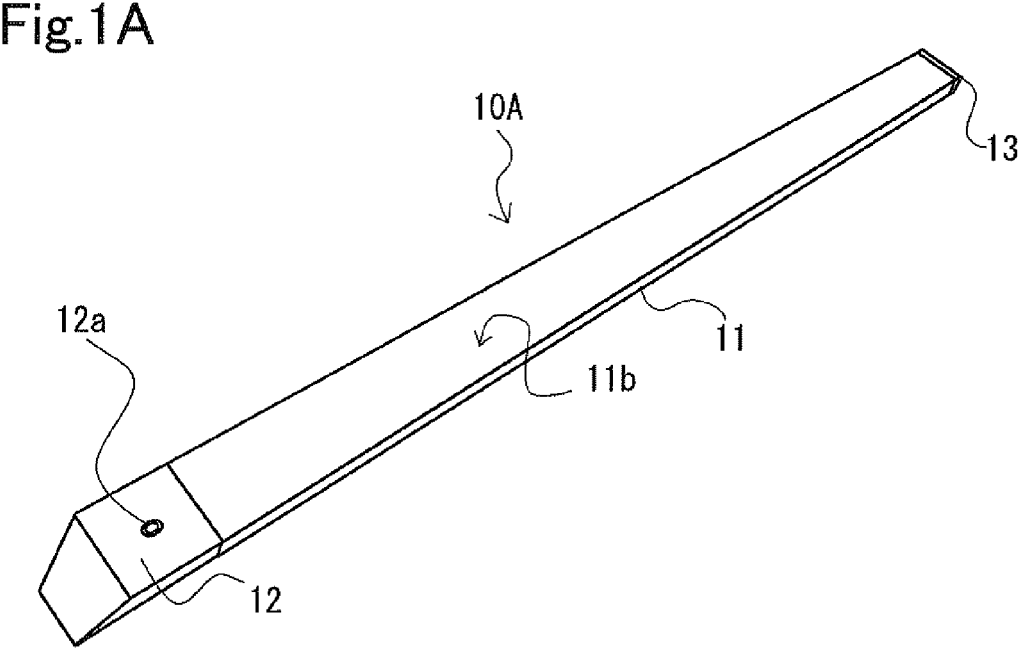
FIGS. 1A and 1B are schematic perspective views showing an exemplary external appearance configuration of a bladder as a jig used for manufacturing a composite material structure, according to an embodiment of the present invention.

REFERENCE SIGNS LISTS 10 bladder (jig used for manufacturing a composite material structure)
11 body
11a contact wall portion (wall portion corresponding to upper base of trapezoidal-shaped transverse cross-section)
11b exposed wall portion (wall portion corresponding to lower base of trapezoidal-shaped transverse cross-section)
12 terminal metal member (metal-made sealing member)
12a pressurization hole
12b insertion portion
13 terminal plug (sealing member made of elastic material)
17 terminal metal member (metal-made sealing member)
17a pressurization hole
17b insertion portion
20 hat stringer
20a band-shaped portion
20b channel portion
30 prepreg
31 skin

DESCRIPTION OF EMBODIMENTS

Hereinafter, preferred embodiments of the present invention will be described with reference to the drawings. Throughout the drawings, the same or corresponding components are designated by the same reference numerals and repetitive description thereof will not be given.

[Basic Configuration of Bladder as Jig Used for Manufacturing Composite Material Structure]

Figure 1B:
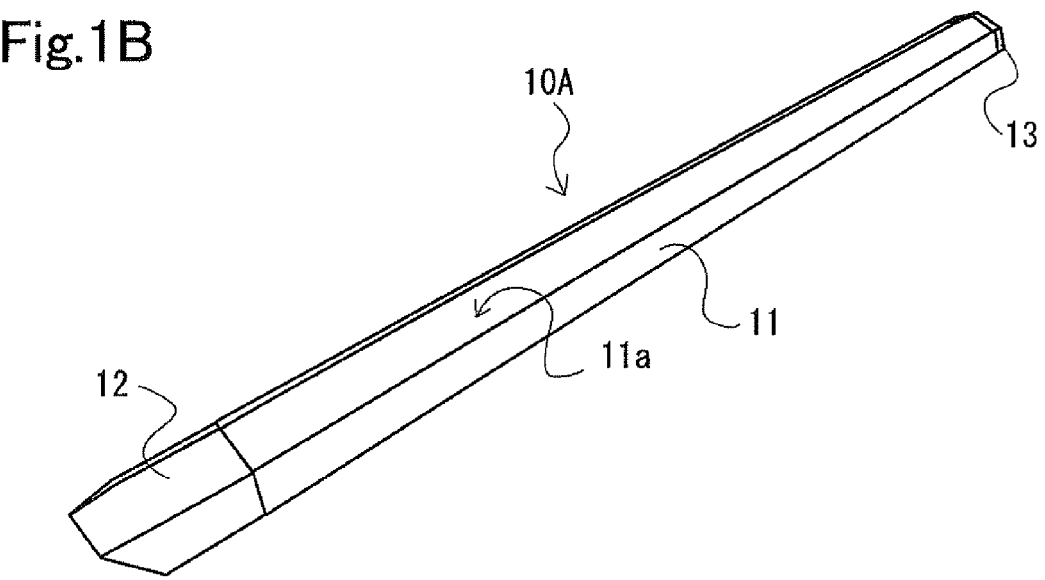
Figure 2A:
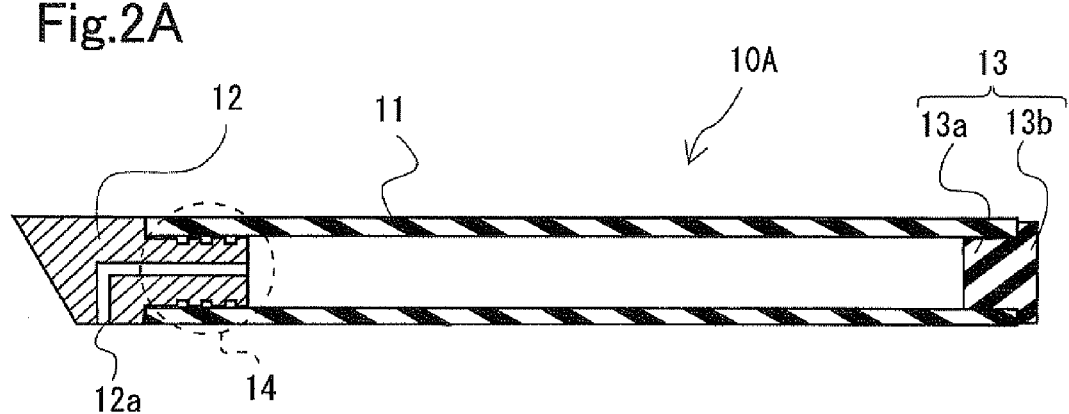
FIG. 2A is a sectional view of the bladder of FIG. 1, in a lengthwise (longitudinal) direction.
Figure 2B:
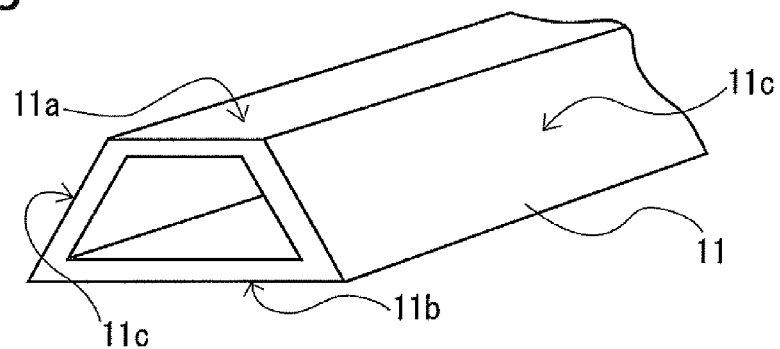
FIGS. 2B and 2C are perspective views showing exemplary structures of a body, and a terminal metal member constituting the bladder of FIG. 2A.
Figure 2C:
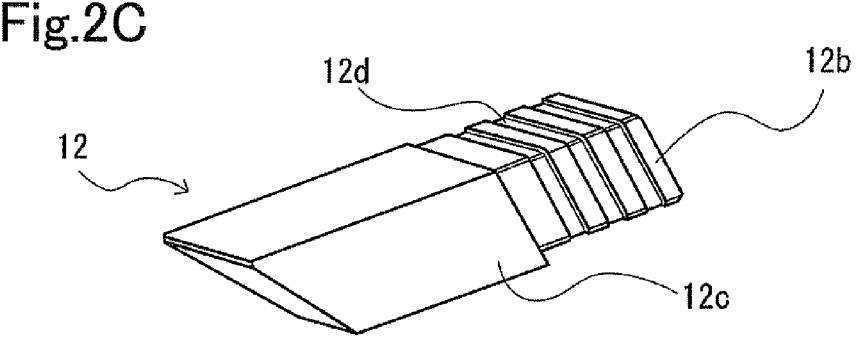

FIGS. 1A and 1B are schematic perspective views showing an exemplary external appearance configuration of a bladder as a jig used for manufacturing a composite material structure, according to the present embodiment. FIG. 2A is a sectional view of the bladder of FIG. 1, in a lengthwise direction. FIG. 2B is a partial perspective view showing a shape of a body of the bladder of FIG. 1. FIG. 2C is a perspective view showing a shape of a terminal metal member 12 attached to one end portion of the bladder of FIG. 1. Hereinafter, the lengthwise direction of the bladder is referred to as "longitudinal direction," and a direction perpendicular to the longitudinal direction is referred to as "transverse direction." A cross-section of the bladder in the longitudinal direction is referred to as "longitudinal cross-section," and a cross-section of the bladder in the transverse direction is referred to as "transverse cross-section."

As shown in FIGS. 1A and 1B, a bladder 10A according to the present embodiment has a columnar shape in its overall external appearance. The bladder 10A includes at least a body 11, the terminal metal member 12, and a terminal plug 13. The body 11 is a member which becomes a main body of the bladder 10A, and has a hollow pipe shape as shown in FIGS. 2A and 2B.

As shown in FIG. 2B, the body 11 has a transverse cross-section of a trapezoidal-shape. As described later, the bladder 10A is required to conform in shape to a channel portion formed on the hat stringer into which the bladder 10A is inserted. A wall portion of the body 11 which corresponds to the upper base of the trapezoidal-shaped transverse cross-section is referred to as "contact wall portion 11a" in the present embodiment, as shown in FIGS. 1B and 2B, because the outer surface of the wall portion contacts the channel portion of the hat stringer. A wall portion of the body 11 which corresponds to the lower base of the trapezoidal-shaped transverse cross-section is referred to as "exposed wall portion 11b" in the present embodiment, as shown in FIGS. 1A and 2B, because the outer surface of the wall portion is exposed in a state where the bladder 10A is inserted into the channel portion of the hat stringer. Therefore, FIG. 1A is a perspective view showing a state where the exposed wall portion 11b is the upper side, while FIG. 1B is a perspective view showing a state where the contact wall portion 11a is the upper side. Of course, the contact wall portion 11a (wall portion corresponding to the upper base) and the exposed wall portion 11b (wall portion corresponding to the lower base) which face each other are parallel to each other.

As shown in FIG. 2B, in the present embodiment, the transverse cross-section of the body 11 has a trapezoidal-shape, to be precise, an isosceles-trapezoidal shape, which is symmetric with respect to a line segment passing through a center point of the upper base and a center point of the lower base. When the wall portions of the body 11, corresponding to oblique sides (lines) of the trapezoidal-shaped transverse cross-section, are inclined wall portions 11c, respectively, the inclined wall portions 11c are inclined in opposite directions with an equal inclination angle. The outer surfaces of the inclined wall portions 11c are surfaces contacting the channel portion of the hat stringer, like the contact wall portion 11a.

As shown in FIG. 2A, the body 11 is pipe-shaped and is sealed at both ends by the terminal metal member 12 and the terminal plug 13, respectively so that the body 11 has a sealed inner space. The body 11 is made of an elastic material. As described later, the body 11 is inflated by pressurization of the interior of the body 11. The thicknesses of the wall portions of the body 11 (contact wall portion 11a, exposed wall portion 11b and inclined wall portions 11c) of the body 11, are required to provide flexibility which allows the body 11 to be inflatable, although this depends on conditions such as a physical property of the elastic material and the degree to which the body 11 is pressurized during use. In the present embodiment, as the elastic material constituting the body 11, a known silicone rubber composition material is preferably used, as described later. Therefore, the thicknesses of the respective wall portions of the body 11 are preferably within a range of 4.0~6.0 mm, more preferably, a range of 4.5~5.5 mm. If the thicknesses of the respective wall portions of the body 11 are within this range, the body 11 can be inflated sufficiently under pressurizing conditions described below, although it depends on a monomer structure or average molecular weight of silicone elastomer which is a major component of the silicone rubber composition material, or the kinds or composition of the components of the silicone rubber composition material. The thicknesses of the respective wall portions may be equal to or differed from each other.

As described above, the transverse-cross section of the body 11 may be the trapezoidal shape conforming in shape to the channel portion of the hat stringer, and its specific dimension is not particularly limited. In the present embodiment, the length of the upper base of the transverse cross-section, i.e., the width of the contact wall portion 11a is within a range of 20~25 mm, the length of the lower base of the transverse cross-section, i.e., the width of the exposed wall portion 11b is within a range of 70~73 mm, and the height H of the transverse cross-section, i.e., a distance between the contact wall portion 11a and the exposed wall portion 11b in the body 11 is within a range of 34~37 mm. However, the dimensions of the transverse cross-section of the body 11 are not limited to these numeric value ranges, but are suitably set according to the shape of the channel portion of the hat stringer.

The overall length of the body 11 is not particularly limited. As described later, the bladder 10A of the present embodiment is used as a jig used for manufacturing a composite material structure, and is inserted into each of channel portions of a plurality of hat stringers for use as a frame member of the composite material structure. Therefore, the body 11 is designed to have various lengths. For example, when the composite material structure is a body of aircraft formed as a one piece barrel (OPB), the length of the hat stringer may be set to fall within a range of 1~10 m. Therefore, the length of the body 11 may be set to fall within a range of 1~10 m, to conform to the length of the hat stringer.

The terminal metal member 12 is a member for sealing one end portion of the body 11. As shown in FIGS. 1A and 2A, the terminal metal member 12 has a pressurization hole 12a. In the present embodiment, as shown in FIG. 2C, the terminal metal member 12 includes at least an insertion portion 12b inserted into a hollow space of the body 11 and a head portion 12c connected to the insertion portion 12b. The insertion portion 12b is adhesively attached to the inner surface of the body 11 by an adhesive (agent) in a state where the terminal metal member 12 is inserted into the body 11. The head portion 12c is exposed to outside in a state where the terminal metal member 12 is inserted into the body 11. As shown in FIG. 2C, a plurality of band-shaped groove portions 12d are provided on the outer peripheral surface of the insertion portion 12b to extend in a direction perpendicular to the longitudinal direction (extending direction of the insertion portion 12b).

The insertion portion 12b may conform in shape to the hollow space of the body 11. In the present embodiment, as shown in FIG. 2B, the wall portions of the body 11 have an equal thickness, and therefore, the transverse cross-section of the hollow space has a trapezoidal shape. Therefore, the insertion portion 12b has a short columnar shape in which its transverse cross-section has a trapezoidal shape. The length of the insertion portion 12b is not particularly limited. The length of the insertion portion 12b may ensure a sufficient contact area to maintain air tightness in the interior of the body 11 in a state where the insertion portion 12b is inserted into the hollow space of the body 11 and adhesively attached to the inner surface of the body 11 by the adhesive. In the present embodiment, the length of the insertion portion 12b is within a range of, for example, 50~70 mm.

As shown in FIG. 2C, the band-shaped groove portions 12d have a shape in which they are wound around the outer peripheral surface of the insertion portion 12b in the lateral direction of the insertion portion 12b, i.e., direction perpendicular to the direction (longitudinal direction, i.e., lengthwise direction of the bladder 10A) in which the insertion portion 12b is inserted into the hollow space of the body 11. The terminal metal member 12 is fastened to the body 11 in such a manner that an adhesive (adhesive agent) is applied to the insertion portion 12b and the insertion portion 12b is inserted into the hollow space of the body 11. As described later, the band-shaped groove portions 12d of the insertion portion 12b allow the insertion portion 12b and the body 11 to be adhesively attached together in a state where the adhesive is filled in the band-shaped groove portions 12d. This can improve an adhesive state between the terminal metal member 12 and the body 11, and enhance air tightness in the interior of the body 11.

The head portion 12c may have a shape having a dimension sufficiently greater than a dimension of the hollow space of the body 11 so that the head portion 12c can be surely exposed to outside of the body 11. As described later, the transverse cross-section of the head portion 12c is preferably substantially equal to a dimension of the outer shape of the body 11 so that the bladder 10A is easily inserted into the channel portion of the hat stringer. In this way, if the transverse cross-section of the head portion 12c is substantially equal in size to the transverse cross-section of the body 11, then the outer surfaces of the respective wall portions of the bladder 10A are substantially the same flat surfaces, to allow the entire bladder 10A to be inserted into and drawn out of the channel portion more easily.

In the present embodiment, the outer end of the head portion 12c of the terminal metal member 12 is not flat but is an inclined surface protruding. To be specific, when the surface of the terminal metal member 12, corresponding to the contact wall portion 11a, is a contact surface, and the surface of the terminal metal member 12, corresponding to the exposed wall portion 11b, is an exposed surface, in a state where the terminal metal member 12 is attached to the body 11, the contact surface of the terminal metal member 12 is flat and the exposed surface is inclined toward the contact surface as shown in FIG. 2C. This allows the outer end surface of the terminal metal member 12 to be an inclined surface. Although not shown, the contact surface may have a width decreasing toward the outer end and its outer end may be pointed. If the outer end of the head portion 12c is the inclined surface (or pointed surface), the bladder 10A is easily drawn out of the channel portion of the hat stringer into which the body 11 is inserted. But, the shape of the head portion 12c is not limited to this shape. The shape of the terminal metal member 12 is not limited to the above configuration in which it includes the insertion portion 12b and the head portion 12c, but may be configured to include another constituent.

As shown in FIGS. 1A and 2A, the terminal metal member 12 has a structure in which one opening of the pressurization hole 12a is formed on the exposed surface of the head portion 12c, and the other opening of the pressurization hole 12a is formed on the end surface of the insertion portion 12b. In FIG. 2C, the exposed surface of the terminal metal member 12 is at a lower side and therefore the pressurization hole 12a is not depicted. The pressurization hole 12a is configured to extend substantially vertically from one opening formed on the exposed surface of the head portion 12c toward an inside of the head portion 12c, then is bent in a substantially center of the head portion 12c toward the insertion portion 12b, and further extends to the opening formed on the end surface of the insertion portion 12b. Therefore, in a state where the bladder 10A is inserted into the channel portion of the hat stringer, one opening of the pressurization hole 12a is exposed in the exposed surface of the head portion 12c of the terminal metal member 12, and the other opening of the pressurization hole 12a is connected to a hollow space of the body 11. Therefore, the pressurization hole 12a is an air passage which provides communication between inside of the body 11 and outside of the body 11, and can pressurize the interior of the body 11 sealed tightly. For example, in the interior of an autoclave in a high-pressure atmosphere, the interior of the body 11 is placed in a high-pressure condition through the pressurization hole 12a, so that the interior of the body 11 sealed tightly is pressurized and hence of the body 11 is inflated.

In the present embodiment, as a material of the terminal metal member 12, aluminum or alloy of aluminum is used. But, the material of the terminal metal member 12 is not limited this. Since the bladder 10A is used as the jig, the terminal metal member 12 is preferably made of a material having a smallest possible weight. In addition, the terminal metal member 12 is preferably made of a material which allows the pressurization hole 12a to be formed easily inside and its shape to be maintained easily. In view of this and to achieve cost saving, in the present embodiment, aluminum or alloy of aluminum is suitably used as the material of the terminal metal member 12. Depending on manufacturing conditions of a composite material structure, conditions other than "lightweight" may be sometimes considered as important. Therefore, for example, a known metal material other than aluminum, ceramic, or a heat-resistant resin composition material, may be selected, or a composite material of metals, ceramic, or heat-resistant resin composite materials may be used.

The terminal plug 13 is a member for tightly sealing the other end portion (end portion on the opposite side of the end portion sealed by the terminal metal member 12) of the body 11. In the present embodiment, as shown in FIG. 2A, the terminal plug 13 includes an insertion portion 13a inserted into the hollow space of the body 11, and an outer lid portion 13b connected to the insertion portion 13a.

Like the insertion portion 12b of the terminal metal member 12, the insertion portion 13a of the terminal plug 13 has a short-column shape with a transverse cross-section of a trapezoidal-shape to conform in shape to the transverse cross-section of the hollow space of the body 11, while the outer lid portion 13b has a plate shape in which its outer diameter is substantially equal to the outer diameter of the body 11. Like the insertion portion 12b of the terminal metal member 12, the length of the insertion portion 13a is not particularly limited, but may be a length for ensuring a sufficient contact area so that the interior of the body 11 is maintained in a sealed condition in a state where the insertion portion 13a is inserted into the hollow space of the body 11 and is adhesively attached to the inner surface of the body 11 by the adhesive. In the present embodiment, the length of the insertion portion 13a is within a range of, for example, 20~30 mm.

A specific shape of the terminal plug 13 and specific dimensions of the constituents of the terminal plug 13 are not limited to the above configuration. For example, the terminal plug 13 may be configured to include constituents other than the insertion portion 13a and the outer lid portion 13b as necessary. Or, the outer lid portion 13b may have a shape other than the plate shape so long as the terminal plug 13 can tightly seal the interior of the body 11.

As described above, in the present embodiment, the body 11 is sealed by two kinds of sealing members which are the terminal metal member 12 and the terminal plug 13. Of course, the present invention is not limited to this. The body 11 may be sealed by metal-made sealing members. Instead of using the separate member which is the sealing member, the pipe-shaped body 11 may be secondarily molded to seal the opening at the other end portion of the body 11.

[Adhesion Configuration of Terminal Metal Member and Body]

In the bladder 10A of the present embodiment, the terminal metal member 12 is adhesively attached to the body 11 by the adhesive more firmly because of the band-shaped groove portions 12d provided on the outer peripheral surface of the insertion portion 12b. This will be described with reference to FIGS. 3A and 3B and FIGS. 4A and 4B, in conjunction with the manufacturing method of the bladder 10A.

Figure 3A:
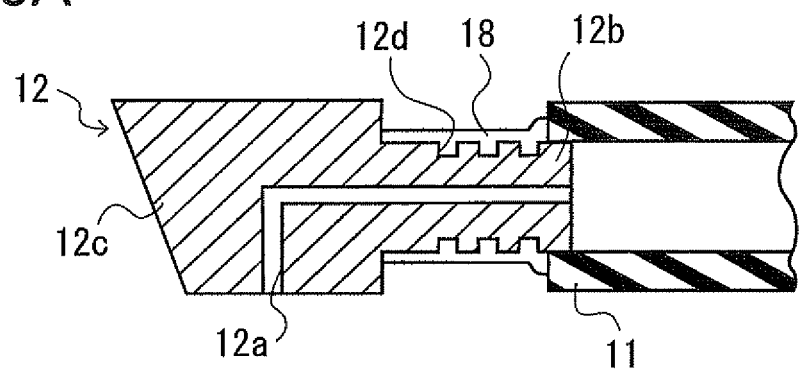
FIGS. 3A and 3B are schematic partial cross-sectional views showing steps for attaching the terminal metal member of FIG. 2C to the body.
Figure 3B:
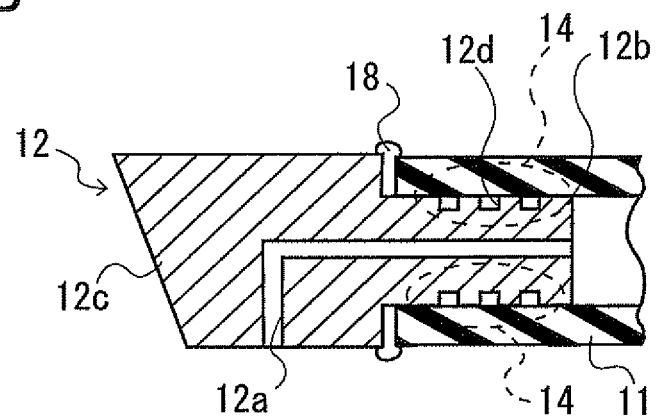
Figure 4A:
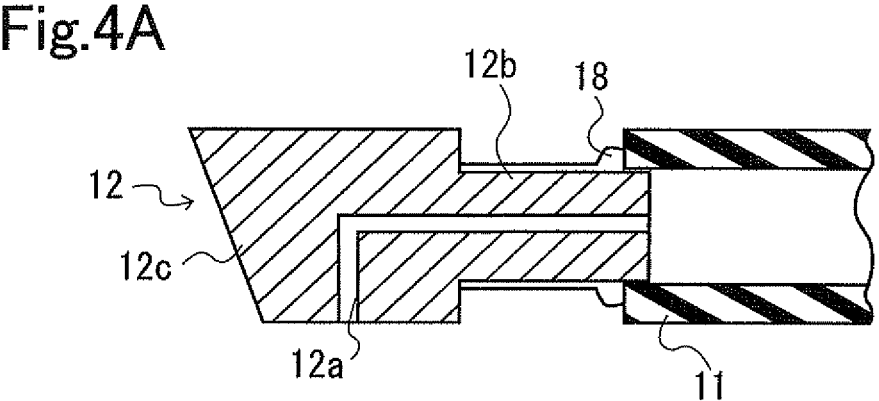
FIGS. 4A and 4B are schematic partial cross-sectional views showing steps for attaching a standard terminal metal member to a body.
Figure 4B:
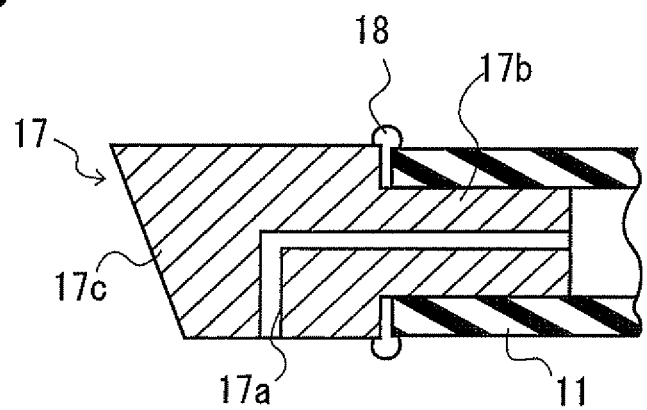

FIGS. 3A and 3B are schematic partial cross-sectional views showing steps for attaching the terminal metal member 12 of FIG. 2C to the body 11. FIGS. 4A and 4B are schematic partial cross-sectional views showing the steps for attaching a standard terminal metal member 17 to the body 11. FIGS. 5A to 5F are schematic views showing specific shapes of the band-shaped groove portions 12d formed on the insertion portion 12b.

Firstly, the body 11 is molded by a known molding method using a heat resistant rubber composition material, and the terminal metal member 12 and the terminal plug 13 are attached to the both ends of the body 11 as the sealing members, respectively. At this time, as shown in FIG. 3A, in a state where a known heat resistant adhesive 18 for use as a heat resistant rubber composition material is applied to the insertion portion 12b of the terminal metal member 12 and the insertion portion 13a of the terminal plug 13 (not shown), the insertion portion 12b and the insertion portion 13a are inserted into the end portions of the body 11, respectively.

Typically, the size of the transverse cross-section of the insertion portion 12b is set substantially equal to the size of the hollow space of the transverse cross-section of the body 11, to improve air tightness in the interior of the bladder 10A.

If the size of the transverse cross-section of the insertion portion 12b is smaller than the size of the hollow space of the transverse cross-section of the body 11, there is a clearance between the outer peripheral surface of the insertion portion 12b and the inner surface of the body 11, in a state where the terminal metal member 12 is inserted into and fastened to the body 11. This clearance is effective as the space for retaining the adhesive 18. The body 11 is inflated by pressurization of the interior of the body 11. If the clearance is too great, the interior of the body 11 cannot be maintained in an air-tight condition, although it depends on the degree of the adhesive state formed by the adhesive 18. In view of the degree to which the body 11 is inflated, the size of the transverse cross-section of the insertion portion 12b is preferably substantially equal to the size of the hollow space of the transverse cross-section of the body 11.

As shown in FIG. 3A, when the insertion portion 12b of the terminal metal member 12 is inserted into the hollow space of the body 11 in the state where the adhesive 18 is applied to the entire outer peripheral surface of the insertion portion 12b of the terminal metal member 12, the adhesive 18 applied to the outer peripheral surface of the insertion portion 12b is scraped by the opening edge of the end portion of the body 11. Because of this, as shown in FIG. 3B, when the insertion portion 12b is inserted into the hollow space of the body 11 substantially completely, a most part of the adhesive 18 is scraped from the outer peripheral surface of the insertion portion 12b, and the scraped adhesive 18 gathers in a space between the opening of the end portion of the body 11 and a stepped portion formed between the head portion 12c and the insertion portion 12b in the terminal metal member 12, and a part of it protrudes outward from the side surface of the body 11 and the side surface of the terminal metal member 12.

The same applies to a case where the standard terminal member 17 is attached to the body 11 as shown in FIGS. 4A and 4B. As shown in FIG. 4A, when the entire outer peripheral surface of an insertion portion 17b of the terminal metal member 17 is applied with the adhesive 18 and the insertion portion 17b is inserted into the hollow space of the body 11, a most part of the adhesive 18 is scraped by the opening edge of the end portion of the body 11, and the scraped adhesive 18 gathers in a space between the opening of the end portion of the body 11 and a stepped portion formed between a head portion 17c and the insertion portion 17b in the terminal metal member 17 as shown in FIG. 4B.

However, in the present embodiment, the plurality of (e.g., three) band-shaped groove portions 12d are provided on the outer peripheral surface of the insertion portion 12b to extend in the direction perpendicular to the longitudinal direction. In the case of the standard terminal metal member 17, as shown in FIG. 4B, a most part of the adhesive 18 is removed from the outer peripheral surface of the insertion portion 17b, when the insertion portion 17b is inserted into the hollow space of the body 11. However, in accordance with the configuration of the present embodiment, as shown in FIG. 3B, the adhesive 18 is filled in the band-shaped groove portions 12d and is left between the insertion portion 12b and the body 11.

As described above, the band-shaped groove portions 12d are provided on the outer peripheral surface of the insertion portion 12b to extend in the direction perpendicular to the longitudinal direction. Because of this, the adhesive 18 left between the insertion portion 12b and the body 11 is retained like an annular seal material between the outer peripheral surface of the insertion portion 12b and the inner surface of the body 11 and form a plurality of (e.g., three) adhesive layers 14. By curing the adhesive 18, the insertion portion 12b and the body 11 can be sufficiently adhesively attached together by the plurality of adhesive layers 14, and can be joined together in a sealed state. This makes it possible to provide a more firmly adhesive state (secured state) between the terminal metal member 12 and the body 11 and improve air tightness in the interior of the body 11.

To particularly improve air tightness in the interior of the body 11, the size of the transverse cross-section of the insertion portion 12b may be set substantially equal to the size of the transverse cross-section of the hollow space of the body 11. In accordance with this configuration, it is possible to prevent formation of a wasteful clearance between the outer peripheral surface of the insertion portion 12b and the inner surface of the body 11. However, in the case of the standard terminal metal member 17, the adhesive 18 cannot be retained between the insertion portion 12b and the body 11, if the size of the transverse cross-section of the insertion portion 12b is set substantially equal to the size of the transverse cross-section of the hollow space of the body 11.

By setting the clearance appropriately, the body 11 can be kept in an air-tight condition, and the adhesive 18 can be retained appropriately. However, in the case of the standard terminal metal member 17, since the outer peripheral surface of the insertion portion 12b is flat, it is difficult to retain the adhesive 18 stably. By comparison, in the present embodiment, since the plurality of adhesive layers 14 can be formed by forming the plurality of band-shaped groove portions 12d on the outer peripheral surface of the insertion portion 12b, it is possible to adhesively attach the terminal metal member 12 to the body 11 more surely.

The specific configuration of the band-shaped groove portions 12d is not particularly limited. For example, as represented by oblique lines in FIG. 5A, band-shaped groove portions 12d-1 may have a band shape in which they are wound around the outer peripheral surface of the insertion portion 12b to extend along a direction (lateral direction) perpendicular to the longitudinal direction, but need not extend along the direction perpendicular to the longitudinal direction. For example, as represented by oblique lines in FIG. 5B, a configuration in which band-shaped groove portions 12d-2 are inclined with respect to the lateral direction, may be used. In a state where the insertion portion 12b is inserted into the body 11, the band-shaped groove portions 12d not only serve as a space in which the adhesive 18 is filled (adhesive retaining function), but also serves to retain the filled adhesive 18 around the insertion portion 12b in an annular shape, like a seal material (have a sealing function). The hand-shaped groove portions 12d may have any shape so long as they can implement such functions.

Figure 5A:
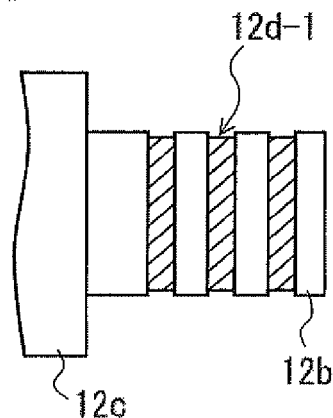
FIGS. 5A to 5F are schematic views showing specific shapes of band-shaped groove portions formed on an insertion portion.
Figure 5B:
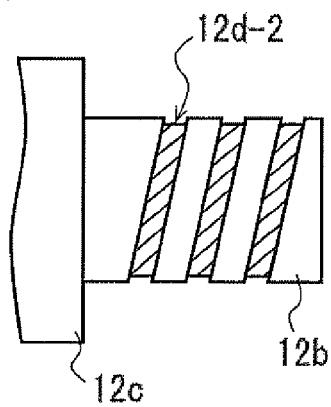
Figure 5C:
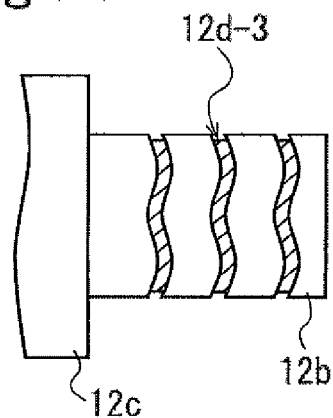

For example, as represented by oblique lines in FIG. 5C, band-shaped groove portions 12d-3 having a corrugated shape may be used. Or, as represented by oblique lines in FIG. 5D, the band-shaped groove portion 12d-1 having a greater width and a band-shaped groove portion 12d-4 having a smaller width may coexist. Or, as represented by oblique lines in FIG. 5E, a band-shaped groove portion 12d-5 may be added to connect three band-shaped groove portions 12d-1 in the longitudinal direction. Or, as represented by oblique lines in FIG. 5F, standard band-shaped portions 12d-1 may be formed at a tip end side and a base end side of the insertion portion 12b, and a broken-line-shaped recess 12d-6 divided in a broken line shape may be formed between them.

Figure 5D:
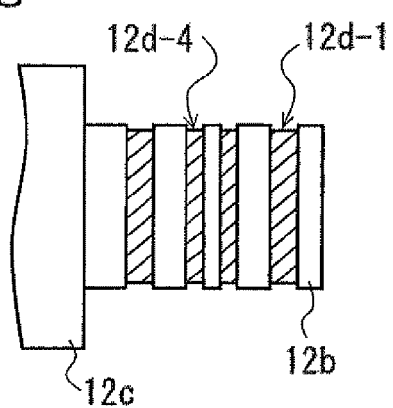
Figure 5E:
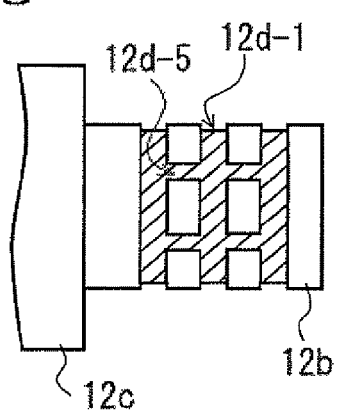
Figure 5F:
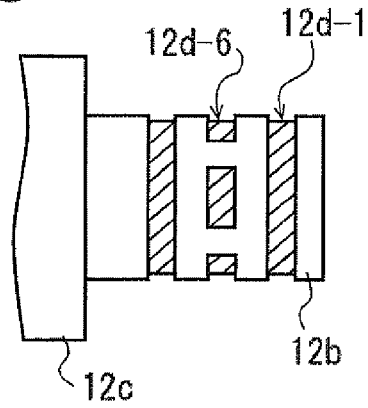

By using a combination of the band-shaped groove portion 12d-1 and the band-shaped groove portion 12d-4 shown in FIG. 5D, or a combination of the band-shaped groove portion 12d-1 and the band-shaped groove portion 12d-5 shown in FIG. 5E, an area of the adhesive layers 14 can be advantageously increased. By using a combination of the band-shaped groove portion 12d-1 and the broken-line-shaped recess 12d-6 as shown in FIG. 5F, the hand-shaped groove portions 12d-1 at the tip end side and at the base end side of the insertion portion 12b provide the sealing function, and the broken-line-shaped recess 12d-6 between them can form the adhesive layer 14 in the intermediate portion of the insertion portion 12b. This can reduce the amount of the adhesive 18.

The dimension of the band-shaped groove portion 12d is not particularly limited. For example, the width and depth of the band-shaped groove portion 12d may be suitably set based on the specific dimension of the insertion portion 12b and the specific dimension of the body 11, provided that the adhesive retaining function and the sealing function can be implemented. In the present embodiment, the width of the band-shaped groove portion 12d may be within a range of 2~5 mm and the depth of the band-shaped groove portion 12d may be within a range of 1~3 mm, if the length of the insertion portion 12b is 50 mm.

The number of the band-shaped groove portions 12d formed on the insertion portion 12b is not particularly limited. To implement the adhesive retaining function and the sealing function, at least one band-shaped groove portion 12d may be formed. To ensure a stably adhesive state over the entire outer peripheral surface of the insertion portion 12b, the band-shaped groove portions 12d are preferably formed at three locations which are the tip end side of the insertion portion 12b, the base end side of the head portion 12c, and a portion between them. That is, the band-shaped groove portions 12d are preferably formed at three locations. Nonetheless, the band-shaped groove portions 12d may be formed at two locations which are the tip end side and the base end side, or at two or more locations between the tip end side and the base end side, in view of conditions such as the length of the insertion portion 12b, or a contact surface area of the band-shaped groove portion 12d with the inner surface of the body 11.

[Method of Using Bladder]

The bladder 10A of the present embodiment is suitably used as a jig of a hat stringer included in a stiffener of a frame member, to manufacture various kinds of composite material structures using stiffened panels. This will be described with reference to FIGS. 6A and 6B, FIGS. 7A and 7B, and FIGS. 8A and 8B.

Figure 6A:
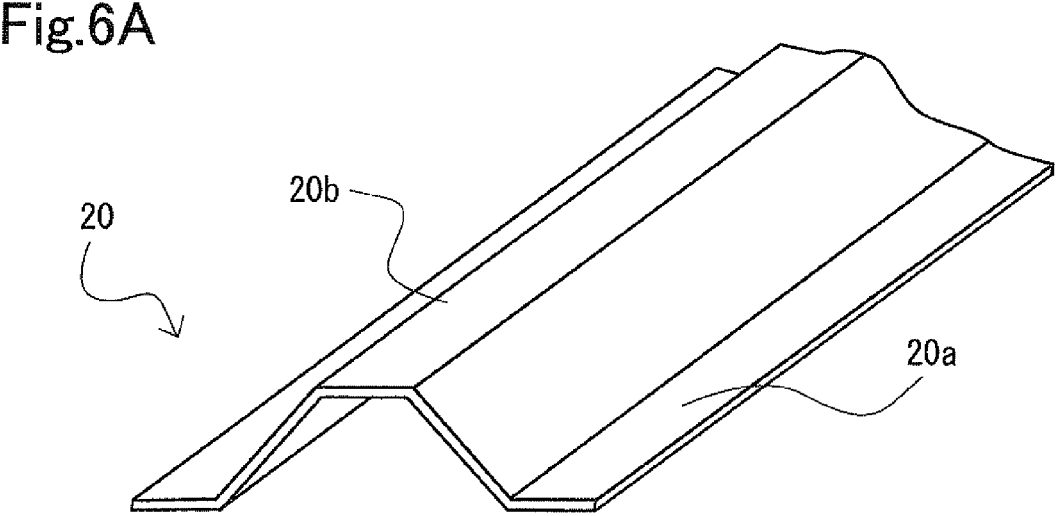
FIGS. 6A and 6B are partial perspective views showing an exemplary configuration of the hat stringer.
Figure 6B:
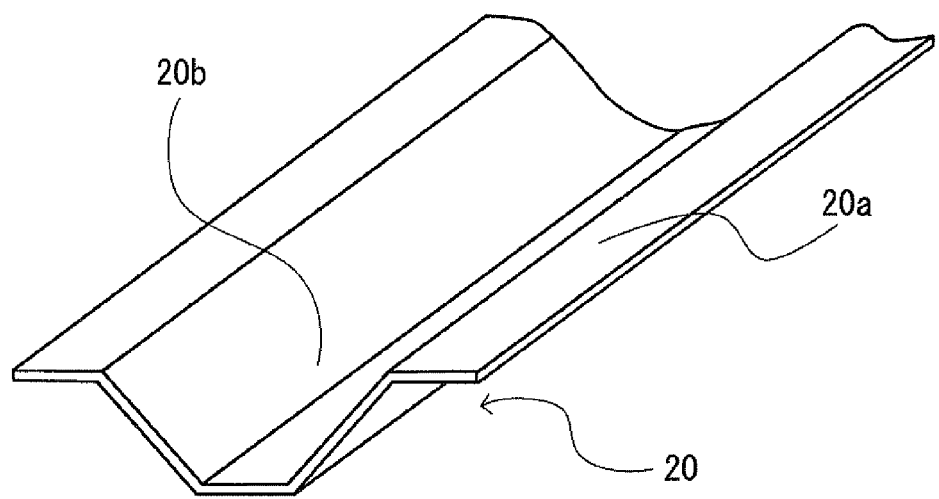
Figure 7A:
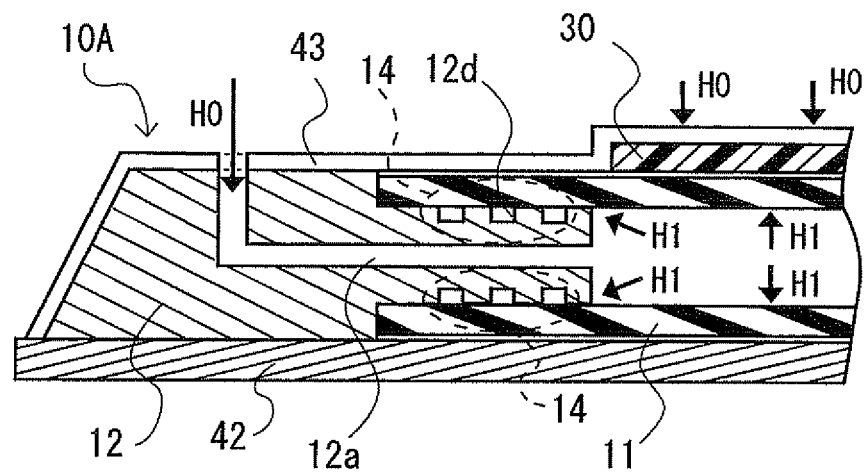
FIGS. 7A and 7B are schematic cross-sectional views showing a positional relationship among the bladder, the prepreg, and a mandrel, in the step of curing the prepreg in an autoclave.
Figure 7B:
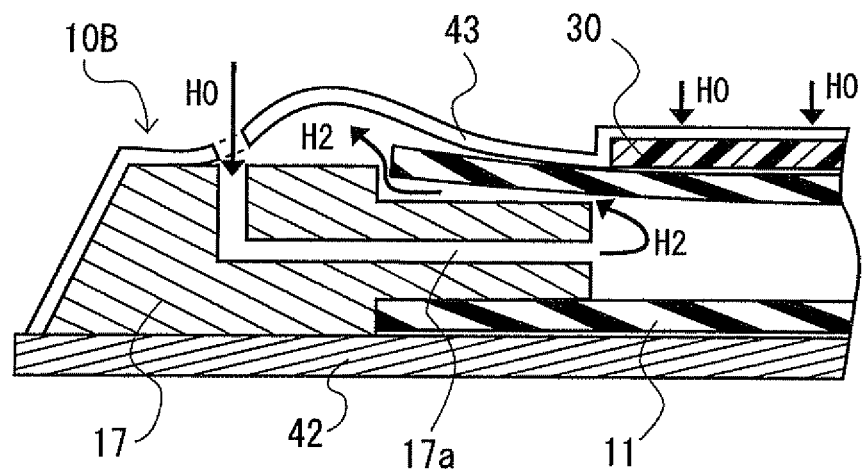

FIGS. 6A and 6B are partial perspective views showing an exemplary configuration of the hat stringer. FIGS. 7A and 7B are schematic cross-sectional views showing a positional relationship among the bladder 10A, the prepreg, and a mandrel, in the step of curing the prepreg in the autoclave. FIGS.

8A and 8B are schematic cross-sectional views showing a state where the bladder 10A is drawn out after the prepreg is cured.

As shown in FIGS. 6A and 6B, the hat stringer 20 has a rod shape or an elongated-plate shape extending in a particular direction. The hat stringer 20 includes a pair of flat band-shaped portions 20a which extend in parallel with each other in its lengthwise direction and a channel portion 20b which is located between the band-shaped portions 20a and is recessed from the surface of the flat portion. The upper surface of the channel portion 20b whose opening is directed downward as shown in FIG. 6A is referred to as an inner surface, while the upper surface of the channel portion 20b whose opening is directed upward is referred to as an outer surface. The bladder 10A is inserted into the channel portion 20b and used.

To be specific, the hat stringer 20 is assembled into a predetermined frame shape conforming to a shape of the structure (structural component). At this time, since the hat stringer 20 is assembled such that its outer surface is located at an outer side, the bladder 10A is inserted into the channel portion 20b. In this state, the prepreg 30 is bonded and attached to the outer surfaces of the band-shaped portions 20a of the hat stringer 20 and to the outer surface of the exposed wall portion 11b of the bladder 10A.

A method of attaching the prepreg 30 to the outer surfaces is not particularly limited. For example, when the structure is a body of aircraft, its frame structure is assembled in a cylindrical shape. In this case, by using an automatic stacking machine including a stacking roller, the prepreg 30 may be bonded and stacked while rotating the cylindrical frame structure. Instead of bonding and attaching the prepreg 30 such that the thickness of the structure is uniform, more layers are stacked together to increase the thickness of the skin in a portion which is required to have enhanced stiffness and strength. For example, in the case of the body of the aircraft, the skin is entirely thinned to achieve lightweight, while the skin is required to be thickened to enhance strength in a portion in the vicinity of a window, a door, or the like. Therefore, before curing, the thickness of the prepreg 30 is not constant.

Then, as schematically shown in FIG. 7A, in a state where stacking of the prepreg 30 is complete, the mandrel 42 which is the jig for maintaining the cylindrical shape is attached to the interior of the cylindrical structure. In addition, the entire structure is covered with a bagging film 43 and is introduced into the autoclave. Inside the autoclave, this structure is heated under a predetermined temperature and pressurized under a predetermined pressure. At this time, as shown in FIG. 7A, a high-temperature and high-pressure atmosphere inside the autoclave is transmitted to the entire prepreg 30 via the bagging film 43, and to the interior of the bladder 10A through the pressurization hole 12a of the terminal metal member 12 of the bladder 10A (arrow HO in FIG. 7A), so that the bladder 10A is inflated. The high-temperature and high-pressure atmosphere inside the autoclave is applied to the entire prepreg 30 (arrow H1 in FIG. 7A).

As indicated by dotted-lines in FIG. 7A, the plurality of (three in FIG. 7A) adhesive layers 14 are formed between the outer peripheral surface of the insertion portion 12b and the inner surface of the body 11. The adhesive layers 14 are retained by the band-shaped groove portions 12d formed on the outer peripheral surface of the insertion portion 12b. This follows that a plurality of annular seal materials formed by the adhesive layers 18 are provided on the outer peripheral surface of the insertion portion 12b. Because of this, the high-temperature and high-pressure atmosphere inside the bladder 10A does not leak through a clearance between the insertion portion 12b and the body 11, which enables the bladder 10A to be inflated sufficiently.

Since the bladder 10A is inflated, a state where the band-shaped portions 20a of the hat stringer 20 (not shown in FIG. 7A) are pressed against the prepreg 30 by a strong external force is maintained, and curing of the prepreg 30 progresses. After the curing of the prepreg 30 is complete, a stiffened panel structure is attained, in which the frame constituted by the hat stringer 20 and the skin formed by curing the prepreg 30 are firmly adhesively attached to each other and integrated with each other.

Figure 8A:
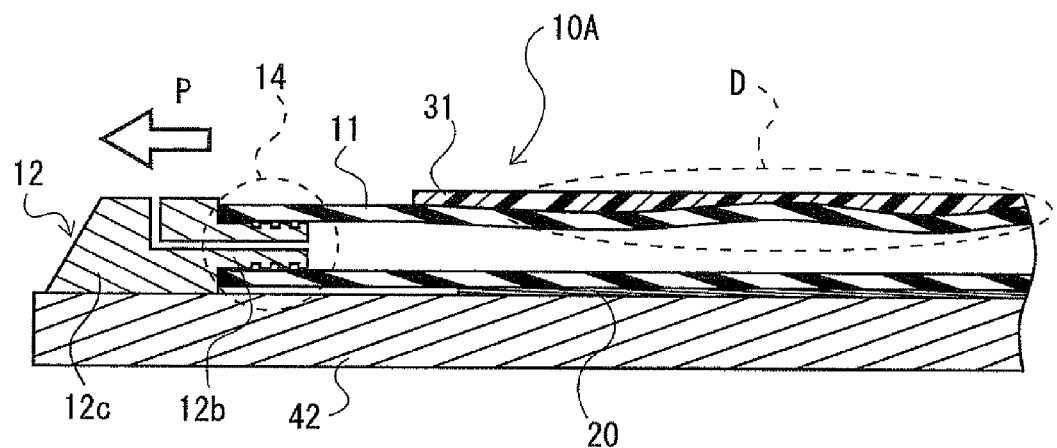
FIGS. 8A and 8B are schematic cross-sectional views showing a state where the bladder is drawn out after the prepreg is cured.
Figure 8B:
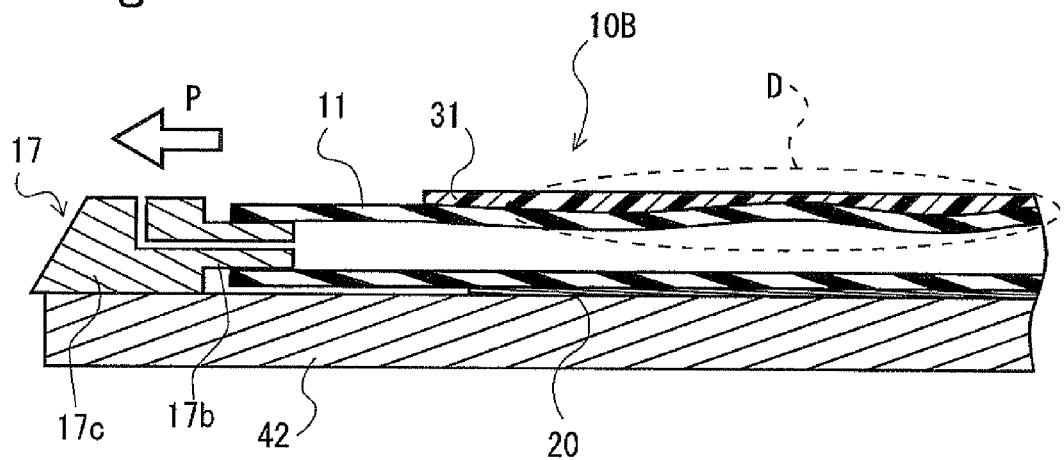

Thereafter, as shown in FIG. 8A, the bladder 10A is drawn out of the region between the cured skin 31 and the hat stringer 20. In the present embodiment, as described above, the bladder 10A is provided with the plurality of adhesive layers 14 between the outer peripheral surface of the insertion portion 12b of the terminal metal member 12 and the inner surface of the body 11, as surrounded by the dotted line in FIG. 8A. Since the adhesive layers 14 are formed at three locations which are the tip end side of the insertion portion 12b, the base end side of insertion portion 12b, and the portion between the tip end side and the base end side, the entire insertion portion 12b can be adhesively attached to the body 11.

As described above, the skin 31 does not have a constant thickness, but has unevenness on its inner surface as indicated by a region D surrounded by the dotted line in FIG. 8A. As shown in FIG. 8A, the bladder 10A is inserted in between the hat stringer 20 and the skin 31 such that the upper portion of the bladder 10A is curved along the unevenness (region D). When the bladder 10A is drawn out of the region between the skin 31 and the hat stringer 20, an external for pulling out the bladder 10A is applied to the head portion 12c of the terminal metal member 12, as indicated by an arrow P in FIG. 8A.

In accordance with the bladder 10A of the present embodiment, the plurality of adhesive layers 14 surrounded by the dotted line in FIG. 8A allow the insertion portion 12b and the body 11 to be adhesively attached together stably. Therefore, even when the upper portion of the bladder 10A is curved along the unevenness of the inner surface of the skin 31, the bladder 10A can be drawn out by dragging the head portion 12c of the terminal metal member 12 to outside.

By comparison, as shown in FIG. 7B, in the case of a bladder 10B including the standard terminal metal member 17, the adhesive is not sufficiently retained between the insertion portion 17b and the body 11, which frequently happens (see FIGS. 4A and 4B). For this reason, if the bladder 10B is drawn out by pulling the head portion 17c of the terminal metal member 17, as indicated by an arrow P in FIG. 8B, the adhesive state between the terminal metal member 17 and the body 11 is not retained sufficiently. This may possibly cause the insertion portion 17b to be disengaged away from the body 11. In this case, the bladder 10B cannot be drawn out easily. In addition, depending on the state of the unevenness on the inner surface of the skin 31, the bladder 10B cannot be drawn out completely.

Even if the insertion portion 17b is not disengaged away from the body 11 completely but the inner surface of the body 11 is separated from the outer peripheral surface of the insertion portion 17b, the air tightness in the interior of the body 11 which should be provided by the insertion portion 17b cannot be maintained sufficiently. If the cylindrical structure is manufactured using the bladder 10B in such a state, as shown in FIG. 7B, in a next occasion, the high-temperature and high-pressure atmosphere leaks from a portion where the insertion portion 17b and the body 11 are not adhesively attached together, which results in a situation where the bladder 10B cannot be inflated sufficiently.

To be specific, as described above, when the prepreg 30 is cured, the mandrel 42 is attached to the interior of the structure, and the entire structure is covered with the bagging film 43 and is introduced into the autoclave. As shown in FIG. 7B, the high-temperature and high-pressure atmosphere in the interior of the autoclave is applied to the entire prepreg 30 via the bagging film 43, and is transmitted to the interior of the bladder 10B through the pressurization hole 17a of the terminal metal member 17 of the bladder 10B (arrow HO in FIG. 7B). If the inner surface of the body 11 is separated from the outer peripheral surface of the insertion portion 17b, the high-temperature and high-pressure atmosphere to be applied to the interior of the body 11 leaks from that portion where the body 11 is separated from the insertion portion 17b (arrow H2 in FIG. 7B).

If the bladder 10B cannot be inflated sufficiently as described above, curing of the prepreg 30 might progress in a state where the band-shaped portions 20a of the hat stringer 20 which are not shown in FIG. 7B are not pressed against the prepreg 30 with a strong external force, and it becomes impossible to manufacture a structure having a proper shape. Therefore, if the adhesive state between the body 11 and the insertion portion 17b in the bladder 10B is insufficient, the bladder 10B cannot be used to manufacture a structure in a next occasion.

As described above, since the bladder 10A of the present invention is provided with the band-shaped groove portions 12d on the outer peripheral surface of the insertion portion 12b of the terminal metal member 12, the adhesive state between the terminal metal member 12 and the body 11 can be improved. Because of this, the bladder 10A is drawn out of the region between the cured skin 31 and the hat stringer 20 without lessening the adhesive state between the terminal metal member 12 and the body 11. As a result, the life of the bladder 10A can be extended. In addition, since the adhesive layers 14 retained by the band-shaped groove portions 12d serve as the seal material on the outer peripheral surface of the insertion portion 12b, the air tightness in the interior of the body 11 can be improved more effectively, and the inflated state of the bladder 10A can be maintained stably.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The present invention is suitably used in a field of manufacturing of composite material structures, in particular, in a field of manufacturing of a stiffened panel structure including a hat stringer.

The invention claimed is:

1. A jig used for manufacturing a composite material structure, the jig being inserted into a channel portion of a hat stringer and used, when the composite material structure is manufactured by attaching prepreg to a frame structure including the hat stringer as a frame member, the channel portion extending in a lengthwise direction of the hat stringer; the jig comprising:
a body having a pipe shape and made of an elastic material, the body having a transverse cross-section of a trapezoidal shape which is a cross-section perpendicular to a lengthwise direction of the body; and
a terminal metal member attached to one end portion of the body and having a pressurization hole for pressurizing an interior of the body;
wherein the terminal metal member has an insertion portion inserted into a hollow space of the body;
the insertion portion has a columnar shape having a transverse cross-section conforming in shape to a contour shape of the hollow space of the body;
the insertion portion is provided on an outer peripheral surface thereof with a band-shaped groove portion wound around the outer peripheral surface; and
the insertion portion is inserted into the hollow space of the body in a state where an adhesive is filled in the band-shaped groove portion.

2. The jig used for manufacturing the composite material structure according to claim 1, wherein the band-shaped groove portion includes a plurality of band-shaped groove portions provided on the insertion portion.

3. The jig used for manufacturing the composite material structure according to claim 2, wherein the elastic material is a heat resistant rubber composition material.

4. The jig used for manufacturing the composite material structure according to claim 1, wherein the elastic material is a heat resistant rubber composition material.

\* \* \* \* \*